(12) United States Patent
Hall et al.

(10) Patent No.: US 9,221,197 B2
(45) Date of Patent: Dec. 29, 2015

(54) METHODS AND SYSTEMS FOR FLOORING MATERIAL RECYCLING

(71) Applicant: Hall Patents, LLC, Denison, TX (US)

(72) Inventors: David Hall, Denison, TX (US); Peggy R. Hall, Denison, TX (US)

(73) Assignee: Hall Patents, LLC, Denison, TX (US)

( * ) Notice: Subject to any disclaimer, the term of this patent is extended or adjusted under 35 U.S.C. 154(b) by 196 days.

(21) Appl. No.: 14/098,205

(22) Filed: Dec. 5, 2013

(65) Prior Publication Data

US 2015/0021422 A1 Jan. 22, 2015

Related U.S. Application Data

(60) Provisional application No. 61/846,826, filed on Jul. 16, 2013.

(51) Int. Cl.
*B02C 23/08* (2006.01)
*B29B 17/02* (2006.01)
*B29L 31/00* (2006.01)

(52) U.S. Cl.
CPC .................. *B29B 17/02* (2013.01); *B02C 23/08* (2013.01); *B29B 2017/0293* (2013.01); *B29L 2031/7322* (2013.01); *Y02W 30/622* (2015.05)

(58) Field of Classification Search
CPC .............................. B02C 23/08; B29B 17/02
USPC .......................... 241/DIG. 38, 20, 60, 3, 101.4
See application file for complete search history.

(56) References Cited

U.S. PATENT DOCUMENTS

| | | |
|---|---|---|
| 5,159,870 A | 11/1992 | Fiala |
| 5,169,870 A | 12/1992 | Corbin et al. |
| 5,230,473 A | 7/1993 | Hagguist et al. |
| 5,240,530 A | 8/1993 | Fink |
| 5,342,854 A | 8/1994 | Serad |
| 5,722,603 A | 3/1998 | Costello et al. |

(Continued)

FOREIGN PATENT DOCUMENTS

WO 9958328 A2 11/1999

OTHER PUBLICATIONS

Foreign Communication From a Related Counterpart Application, PCT Application No. PCT/US2014/046793; PCT Search Report and Written Opinion dated Nov. 13, 2014; 11 pages.

(Continued)

*Primary Examiner* — Mark Rosenbaum

(74) *Attorney, Agent, or Firm* — Edwin S. Flores; Daniel J. Chalker; Chalker Flores, LLP

(57) ABSTRACT

The present disclosure includes improved systems and methods for recycling, including an improved method of recycling one or more polymers from a flooring material that has been contacted with a solvent to provide a reclaimed polymer composition. The improved method, in one embodiment, includes prior to the step of contacting the flooring material with the solvent, cutting the flooring material into portions that provide substantially complete contact between the flooring material and the solvent. The improved method, in this embodiment, further includes following the step of contacting the flooring material with the solvent, contacting the portions of flooring material with a mechanical disruptor that both pulls and separates the one or polymers concurrently in at least two different vectors for a time sufficient to separate the one or more polymers.

19 Claims, 5 Drawing Sheets

(56) References Cited

U.S. PATENT DOCUMENTS

| | | | |
|---|---|---|---|
| 5,898,063 | A | 4/1999 | Stefandl |
| 6,610,769 | B1 | 8/2003 | Scott et al. |
| 7,820,728 | B2 | 10/2010 | Wright et al. |
| 2010/0204441 | A1 | 8/2010 | Pardikes |
| 2011/0039056 | A1 | 2/2011 | Mantle et al. |

OTHER PUBLICATIONS

Summary of Data for Chemical Selection; Methyl Soyate; Dec. 12, 2000; 19 pages.

Soysolv II; Material Safety Data Sheet; Nov. 2, 2010; 2 pages.

METHODS AND SYSTEMS FOR FLOORING MATERIAL RECYCLING

CROSS-REFERENCE TO RELATED APPLICATION

This application claims the benefit of U.S. Provisional Application Ser. No. 61/846,826, filed by David Hall, et al., on Jul. 16, 2013, entitled "Methods and Systems for Carpet Recycling," commonly assigned with this application and incorporated herein by reference.

TECHNICAL FIELD

The present disclosure relates in general to the field of flooring material recycling, and more particularly, to improved methods and systems for the comprehensive recycling of flooring material components.

BACKGROUND

Without limiting the scope of the disclosure, its background is described in connection with carpet recycling.

The problem of carpet recycling, as landfills reach capacity, is reaching a critical stage. One critical problem in the recycling arts today is the problem of waste during recycling processes using basic carpets. The problem becomes exacerbated as newer synthetic polymers and previously recycled materials are used to produce carpet. One unsolved problem in the recycling arts is the challenge that the carpet components are designed to be strongly commingled mechanically and chemically. Due to the strong chemical and mechanical bonding or attachment of the carpet components, useful raw materials that are substantially contaminant-free, ash-free and in a substantially unaltered form following recycling has not been attained.

One method for carpet recycling is taught in U.S. Pat. No. 7,820,728, issued to Wright, et al., which is directed to methods and systems for recycling carpet and carpets manufactured from recycled material. Relevant to the improvements of the present disclosure are the methods for recycling carpet that can recover one or more polymeric carpet components. Specifically, this patent teaches the dissolution of the backing of the polymeric carpet components using certain terpene solvents. However, despite the knowledge of this methodology as of the earliest filing date of this patent in 2006, substantially waste-free carpet recycling is not currently available.

Another such idea is taught in U.S. Pat. No. 5,169,870, issued to Corbin, et al., for reclaiming $\epsilon$-caprolactam from nylon 6 carpet. The process taught by this patent includes the continuous recovery of $\epsilon$-caprolactam from a carpet made from nylon 6 and a backing that is inserted into a mechanical separator that prepares scrap-containing nylon 6 and waste. The scrap from the separator is fed to a depolymerizing reactor where the scrap is subjected to a depolymerization catalyst, temperatures of at least the melting point of nylon 6 and superheated steam to produce an $\epsilon$-caprolactam containing distillate and more waste. The $\epsilon$-caprolactam in the distillate is said to separate the polymeric components from other volatile agents and is then purified.

Mechanical carpet disruption methods have been taught by a number of patents, including: U.S. Pat. No. 6,610,769, which discloses a method of employing an adhesive that can be completely removed by applying shear in the presence of an aqueous alkaline solution; U.S. Pat. No. 5,240,530, which discloses a method of grinding carpet to a fiber length of less than about one-quarter inch and washing in a water bath to allow the various materials of the carpet to be separated by density; U.S. Pat. No. 5,230,473, which discloses a method for disintegrating, separating, and segregating whole carpet by loosening and debonding the latex/filler binder system by repeated application of highly pressurized fluids such as air, water, heated air, steam, and chemical solutions, and repeated stripping with rotating elements; and U.S. Pat. No. 5,722,603, which discloses a method of recovering face fiber from a carpet employing numerous steps of shredding and impact forces that reduce particle size, separating and washing the particles with screens, followed by separation of the components in water in a hydrocyclone, with the option of using additives that are disrupted by sodium hydroxide and non-ionic surfactants.

Despite these various methods and systems for recycling carpet, a need remains for the development of environmentally friendly systems and methods that lead to recycling a majority of the carpet components, with significantly reduced waste, using sustainable compositions and methods, and that yield high quality, clean carpet components that can be completely recycled.

SUMMARY

The present inventors have found novel methods, systems and improvements that, in one embodiment, make substantially contaminant-free, ash-free and in a substantially unaltered form flooring material subcomponents following recycling attainable. In fact, it has been found that the recycled components using the methods and systems of the present disclosure provide a substantial advantage over the known methods, including, providing components that are almost completely recycled, in a substantially unaltered form, and using environmentally friendly components. It was found that all or substantially all the subcomponents of the flooring material can be reused as a result of the methods and systems of the present disclosure without significant, if any, additional processing or cleaning. It was further found that the novel methods, systems and improvements of the present disclosure provide, for the first time, a solution to the problem that flooring material components are designed to be strongly commingled mechanically and chemically, including newer flooring material materials and structural designs that have made flooring material recycling even more difficult.

In one embodiment, the present disclosure includes an improved system for recycling one or more polymers from a flooring material that has been contacted with a solvent to dissolve an adhesive flooring material backing under conditions that dissolve the adhesive flooring material backing to provide a reclaimed polymer composition, the improvement comprising: a mechanical disruptor that both pulls and separates the polymers from the adhesive flooring material backing concurrently in at least two different vectors for a time sufficient to separate the one or more polymers from the adhesive flooring material backing following the step of dissolving the flooring material backing with the solvent, contacting the portions of flooring material, wherein the improvement provides for the complete separation of two or more polymer components, and the flooring material adhesive, and the two or more polymers from the flooring material are produced without substantially sheering the two or more polymers. In one aspect, greater than about 70, 75, 80, 85, 90, 95, 96, 97, 98, or 99% of the flooring material components are recycled. In another aspect, substantially all the flooring material components are recycled. In another aspect, the solvent is selected from at least one of a terpene solvent, a D-limonene, a pinene, an α-pinene or water. In another aspect, the mechanical disruptor comprises two or more mixing heads, blades, beaters, wisks, paddles, jets, screws, or rollers, among others, that provide the mechanical disruption in the at least two different vectors. In another aspect, the mechanical disruptor is contacted with the flooring material components following partial or substantial dissolution of the adhesive flooring material backing for a time sufficient to separate two or more different polymers from the flooring material without substantially sheering the two or more polymers. In another aspect, the mechanical disruptor is contacted with the flooring material components following partial or substantial dissolution of the adhesive flooring material backing for about 1 to 30, 2 to 25, 3 to 20, 4 to 15, 5 to 15, 4, 5, 6, 7, 8, 9, 10, 11, 12, 13, 14, or 15 minutes without substantially sheering the two or more polymers. In another aspect, the one or more polymers are selected from at least one of a HDPE, LDPE, LLDPE, ULDPE, VLDPE, VLLDPE, copolymers of ethylene and α-olefins, polypropylene, copolymers of propylene and α-olefins, copolymers of propylene and ethylene, EVA, and EMA. In another aspect, following the separation of the one or more polymers, the polymers are about 70, 75, 80, 85, 90, 95, 96, 97, 98, or 99% ash-free. In another aspect, following the separation of the one or more polymers, the polymers are substantially ash-free. In another aspect, the mechanical disruptor comprises two or more mixing heads, blades, beaters, wisks, paddles, jets, screws, or rollers that provide the mechanical disruption in the at least two different vectors. In another aspect, the system further comprises one or more shredders capable of cutting the flooring material into portions of a size that provides complete contact between the flooring material and the solvent. In another aspect, the solvent further comprises an acid that improves the dissolution of the flooring material adhesive.

Another embodiment of the present disclosure includes an improved method of recycling one or more polymers from a flooring material that has been contacted with a solvent to provide a reclaimed polymer composition, the improvement comprising: prior to the step of contacting the flooring material with the solvent, cutting the flooring material into portions that provide substantially complete contact between the flooring material and the solvent; and following the step of contacting the flooring material with the solvent, contacting the portions of flooring material with a mechanical disruptor that both pulls and separates the one or polymers concurrently in at least two different vectors for a time sufficient to separate the one or more polymers. In one aspect, greater than about 70, 75, 80, 85, 90, 95, 96, 97, 98, or 99% of the flooring material components are recycled. In another aspect, substantially all the flooring material components are recycled. In another aspect, the solvent is selected from at least one of a terpene solvent, a D-limonene, a pinene, an α-pinene or water. In another aspect, the mechanical disruptor comprises two or more mixing heads, blades, beaters, wisks, paddles, jets, screws, or rollers, among others, that provide the mechanical disruption in the at least two different vectors. In another aspect, the mechanical disruptor is contacted with the flooring material components following partial or substantial dissolution of the adhesive flooring material backing for a time sufficient to separate two or more different polymers from the flooring material without substantially sheering the two or more polymers. In another aspect, the mechanical disruptor is contacted with the flooring material components following partial or substantial dissolution of the adhesive flooring material backing for about 1 to 30, 2 to 25, 3 to 20, 4 to 15, 5 to 15, 4, 5, 6, 7, 8, 9, 10, 11, 12, 13, 14, or 15 minutes without substantially sheering the two or more polymers. In another aspect, the one or more polymers are selected from at least one of a HDPE, LDPE, LLDPE, ULDPE, VLDPE, VLLDPE, copolymers of ethylene and α-olefins, polypropylene, copolymers of propylene and α-olefins, copolymers of propylene and ethylene, EVA, and EMA. In another aspect, following the separation of the one or more polymers, the polymers are about 70, 75, 80, 85, 90, 95, 96, 97, 98, or 99% ash-free. In another aspect, following the separation of the one or more polymers, the polymers are substantially ash-free.

Yet another embodiment of the present disclosure includes an improved method of recycling one or more polymers from a flooring material that has been contacted with a terpene solvent to dissolve an adhesive flooring material backing under conditions that dissolve the adhesive flooring material backing to provide a reclaimed polymer composition, the improvement comprising: prior to the step of contacting the flooring material with the terpene solvent cutting the flooring material into portions that provides substantially complete contact between the flooring material and the solvent; and following the step of dissolving the flooring material backing with the terpene solvent, contacting the portions of flooring material with a mechanical disruptor that both pulls and separates the polymers from the adhesive flooring material backing concurrently in at least two different vectors for a time sufficient to separate the one or more polymers from the adhesive flooring material backing. In one aspect, greater than about 70, 75, 80, 85, 90, 95, 96, 97, 98, or 99% of the flooring material components are recycled. In another aspect, substantially all the flooring material components are recycled. In another aspect, the terpene solvent is selected from at least one of D-limonene, a pinene, or α-pinene. In another aspect, the mechanical disruptor comprises two or more mixing heads, blades, beaters, wisks, paddles, jets, screws, or rollers, among others, that provide the mechanical disruption in the at least two different vectors. In another aspect, the mechanical disruptor is contacted with the flooring material components following partial or substantial dissolution of the adhesive flooring material backing for a time sufficient to separate two or more different polymers from the flooring material without substantially sheering the two or more polymers. In another aspect, the mechanical disruptor is contacted with the flooring material components following partial or substantial dissolution of the adhesive flooring material backing for about 1 to 30, 2 to 25, 3 to 20, 4 to 15, 5 to 15, 4, 5, 6, 7, 8, 9, 10, 11, 12, 13, 14, or 15 minutes without substantially sheering the two or more polymers. In another aspect, following the separation of the one or more polymers, the polymers are about 70, 75, 80, 85, 90, 95, 96, 97, 98, or 99% ash-free. In another aspect, following the separation of the one or more polymers, the polymers are substantially ash-free.

Yet another embodiment of the present disclosure includes a method of recycling one or more polymers from a flooring material comprising: cutting flooring material into portions that provide substantially complete contact between the flooring material and a solvent; subjecting the flooring material portions to a solvent to dissolve an adhesive backing thereof; contacting the flooring material portions with a mechanical disruptor that both pulls and separates one or more polymers of the flooring material from the adhesive backing concurrently in at least two different vectors for a time sufficient to separate the one or more polymers from the adhesive backing; and separating remaining adhesive away from the one or more polymers by at least one of crushing or squeezing, wherein greater than about 70% of components of the flooring material may be recycled.

Yet another embodiment of the present disclosure includes a system for recycling one or more polymers from a flooring material comprising: one or more shredders capable of cutting flooring material into portions of a size that provides complete contact between the flooring material and a solvent capable of dissolving an adhesive backing of the flooring material away from one or more flooring material polymers; a vat or container in communication with the one or more shredders, the vat or container configured to accept the cut flooring material portions and subject the cut flooring material portions to the solvent; a mechanical disruptor that both pulls and separates the one or more polymers from the adhesive backing concurrently in at least two different vectors for a time sufficient to separate the one or more polymers from the adhesive backing following subjecting the cut flooring material portions to the solvent; and one or more rollers configured to crush adhesive particles remaining on the one or more polymers, wherein the system achieves complete separation of the one or more polymer components and the adhesive backing without substantially sheering the one or more polymers.

BRIEF DESCRIPTION

Reference is now made to the following descriptions taken in conjunction with the accompanying drawings, in which.

DETAILED DESCRIPTION

Figure 1:
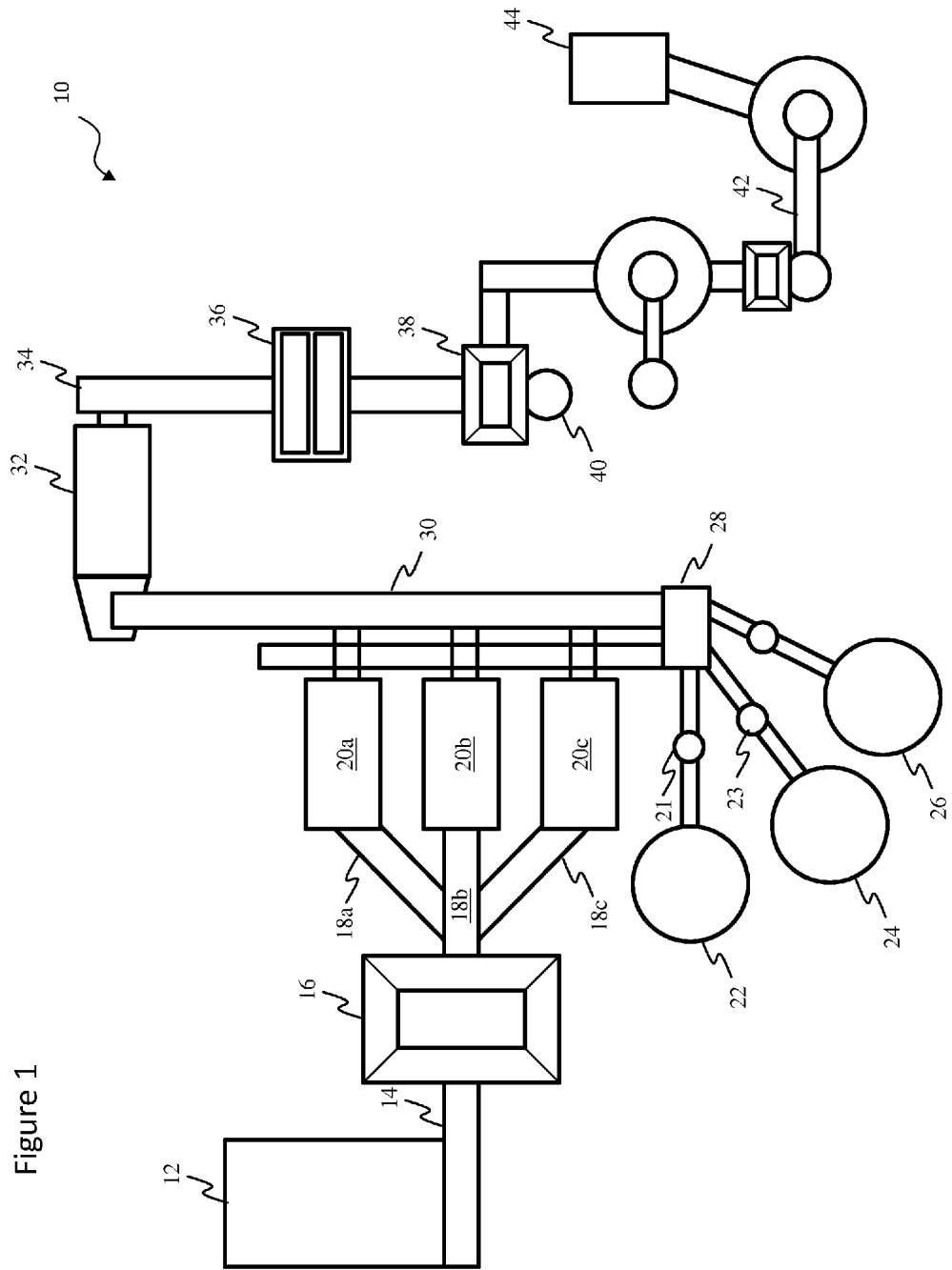
FIG. 1 is a diagram that outlines one embodiment of the overall process of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the idea and do not delimit the scope of the disclosure.

To facilitate the understanding of this disclosure, a number of terms are defined below. Terms defined herein have meanings as commonly understood by a person of ordinary skill in the areas relevant to the present disclosure. Terms such as "a", "an" and "the" are not intended to refer to only a singular entity, but include the general class of which a specific example may be used for illustration. The terminology herein is used to describe specific embodiments of the disclosure, but their usage does not delimit the disclosure, except as outlined in the claims.

The term flooring material, as used herein, should not be unduly limited to any specific type of flooring material. In contrast, the term flooring material, as used herein, may encompass many different types of flooring including both carpet and artificial turf, among others. The term carpet, as used herein, generally refers to a textile/polyester floor covering consisting of an upper layer of pile attached to a backing. The term artificial turf, as used herein, generally refers to short pile synthetic turf. Notwithstanding the above definitions, other types of carpets and artificial turf, as might be known by those skilled in the art, are within the scope of the term flooring material.

For the purpose of the present disclosure, the majority of the references and discussions may relate to carpet. Notwithstanding the focus on carpet, as opposed to artificial turf, those skilled in the art should understand that such disclosed processes and machinery are equally as applicable to artificial turf.

The problem of carpet recycling continues to grow as landfills reach capacity and the need increases for reduced costs. One critical problem in the recycling arts today is the problem of waste that results from recycling processes that only recovery 30, 40, 50, 60, or even 70% of the carpets' components. The problem becomes exacerbated as newer synthetic polymers and previously recycled materials are used to produce carpet from these materials. Furthermore, it is also necessary to recycle the adhesives used to provide rigidity to the carpet. Another unsolved problem in the recycling arts is the challenge that the carpet components are designed to be strongly commingled mechanically and/or chemically. That is, by design, carpet components are not intended to be easy to separate. Due to the strong chemical and/or mechanical bonding or attachment of the carpet components, the isolation of useful raw materials for recycling that are substantially contaminant-free, ash-free and in a substantially unaltered form following recycling has not been attained.

The present disclosure provides critical and long needed improvements to previously developed methods that, despite their promise, are not in use today. In other words, while one or more subprocesses that can be used with the present disclosure have been available and under development for half a dozen years or more, the promise of the methodology has failed to reach its potential due to the lack of one or more critical improvements that make a complete, improved process possible. That is, despite the availability of these methods, a viable process is not producing, to date, the recycling of substantially all the raw components of a carpet in a sound, commercially viable manner.

The present disclosure provides, for the first time, the improvements necessary to recycle the majority of the carpet components, including about 70, 75, 80, 90, 95, 96, 97, 98, 99, or almost 100% of the fibers from a carpet. These recycled fibers are also produced in a manner that provides a final product that is substantially ash-free and that is clean enough to be used directly in a new carpet. The process of the present disclosure also provides recycling of the majority of the adhesive, including about 70, 75, 80, 90, 95, 96, 97, 98, 99, or almost 100% of the adhesive. Furthermore, the processes of the present disclosure can use as solvents during certain process steps components solvents that are from renewable sources, biocompatible, and/or recyclable. The components can be used multiple times and can be regenerated multiple times in a continuous or batch process to yield and separate all the components of a carpet in need of recycling. Furthermore, the improvement provided herein eliminates the need for hauling carpet in need of recycling vast distances as the process can be made in small processing locations or can be scaled-up to generate clean recycled carpet, raw materials that can then be shipped at a greatly reduced cost as unwanted materials (e.g., dirt, backing and adhesive) have been removed prior to shipping.

The following is one example of carpet recycling that can be used with the present disclosure and that incorporates the improvements herein. The present disclosure includes a processing plant and process for harvesting fiber from carpet that generally begins with sorting of the carpet by type, e.g., carpets that include nylon, polypropylene, polyester (e.g., "PET" (polyethylene terephthalate) or "PTT" (polytrimethylene terephthalate)), acrylic, wool and wool blends. Next, once the carpet is sorted into its category, the carpet can be loaded on a conveyor to be shredded into, e.g., about 5, 4, 3, 2, 1.5, 1, 0.5 inch or smaller pieces. Once the carpet is fragmented, it may be advantageous to separate loose fibers, e.g., pet hair, with a vacuum prior to proceeding to the next step. From the shredder the carpet fragments travel by conveyor to a vat to be combined with a solvent that dissolves the adhesive, e.g., heated water, a terpene solvent (e.g., d-limonene or (Orange oil), d-limonene mix, or other terpene solvents), and/or a biocompatible acid, such as acetic acid. In another embodiment, the solvent is a soy based (e.g., soy including) solvent. For example, the soy based solvent could be a mixture of methyl soyate and one or more surfactants, among others. A variety of such soy based solvents are Soysolv, Soysolv II, Soysolv II Plus, Graffiti Remover, Soysolv DS, All Purpose Cleaner, Waterless Hand Cleaner, CMR, Glass and Surface Cleaner, MQL Stick Lubricant, Tapsolv, Ice-Sole and Tack-Sole, all of which may be obtained from SOYsolv, having a business address of 6154 N. CR 33, Tiffin Ohio, 44883. Nevertheless, other soy including solvents are within the scope of the present disclosure. Notwithstanding the foregoing, terpene solvents are particularly useful with artificial turf, whereas soy based solvents are less useful.

It has been found that when using the heated water method, the heated water temperature should be between about 120° F. to 140° F., with certain improved results obtained at about 130° F., plus or minus about 1, 2, 3, 4, 5, or 10 degrees. When using a biocompatible terpene solvent, the temperature can be between about 120° F. to 140° F., however, at a lower temperature the terpene solvents (d-limonene or Orange oil combined with d-limonene) work as well. A certain advantage has been found by the present inventors when combining the terpene solvent with one or more biocompatible acids, e.g., acetic acid that permits the use of a lower concentration of the terpene solvent. While a high temperature can be used, the terpene solvent can begin to evaporate, which can be mitigated by placing the solvent-carpet mix into a pressurized vessel, or can be mixed with acid to reduce the need to increase the temperature, which causes evaporation of the solvent. The use of acid with the water or terpene solvent method provides another unique advantage of the present disclosure.

Next, the carpet fragment and solvent solution are mixed, e.g., at slow speed for about 15 to 20 minutes, or more, with clockwise and counter-clockwise rotation. Generally, the carpet fragment and solvent solution will be combined in a manner that substantially, if not completely, saturates the carpet fragments and provides maximum exposure of the carpet adhesive, adhesives attached to the carpet, contaminants in the carpet (e.g., and dirt in the carpet fragments) to the solvent solution. In one embodiment of the present disclosure, both the water solvent and terpene solvent processes are used in series. The order of the process can depend on the nature of the carpet fragments. For example, if the carpet fragments are known to contain organic or hydrophobic dirt or contamination (e.g., motor oil) it may be advantageous to use the terpene solvent method before the water process. Likewise, if the carpet contains hydrophilic contamination, e.g., pet urine, then the water solvent process might be used first.

After the carpet fragments have been exposed to the water, acid, and/or terpene solvent solution, the solution is drained from the vat, and can pass through a filtration system to remove solid contaminants, e.g., pet hair, loose fibers, paint, of other contaminants from the adhesive dissolving solution, which can be transported to a holding tank for re-use. The carpet fragments can then proceed to one or more optional rinse cycles, that can include one or more rinses with warm water. The water used for the rinse can then be placed in a holding tank for addition to the solvent solution, thus recycling that portion of the solutions used in the overall process. One or more additional rinse cycles that use, e.g., warm water, can be used prior to the separation step. Often, the rinse can last from just a rinse to a residence time of about 5, 10, 15, 20, 25, 30, or more minutes at which time, a rinse solution (e.g., water) may be drained through a filtration system and reused for rinsing or used in an upstream process.

The next step provides one of the unexpected and important improvements of the present disclosure. While the water and terpene solvent processes have been used in the art, one of the critical steps that has defied solution has been the separation of the components of basic carpet, the adhesive backing and the one or more polymer fibers (e.g., blender turn on to higher speed to break up carpet fibers). Often carpet includes two or three components, an adhesive backing, an optional mat of fibers that help trap or mechanically restrain the carpet fibers (which is the portion of the carpet that is visible to the carpet owner), and the carpet fibers themselves, which are embedded in the optional mat and/or the adhesive by a variety of methods. The present inventors have found that the separation step should address the nature of the mechanical connection between the carpet fibers, the adhesive and/or the optional mat of fibers or polymers. A critical improvement and complete carpet fiber was obtained by using two different vectors of mechanical separation. The skilled artisan will recognize that a "vector" provides both a direction and a magnitude. As used in the context of the present disclosure, the term vector refers to a mechanical force that has both a direction and a magnitude, such as that created by, e.g., mechanical blender blades that not only "tug" at the fibers in one or more directions, but that also have a pull strength or magnitude that draws the individual fibers (be it a carpet fiber or the polymers in the mat) away from each other in two or more different directions at the same time. The amount of mechanical strength and the total time during which the carpet fragments are separated is one of the important improvements provided by the present disclosure. The present inventors have found that both have to be limited so that the carpet fibers and the polymer strands of fibers that comprise the mat are not shredded during the process. However, the time and strength must be such that the carpet fibers and the mats are separated from each other and the adhesive. It has been found that two or more blender blades operating in unison operating at a range from about 1 to 1850 rpms provide sufficient mechanical pull in two or more vectors to separate the carpet components to achieve from about 70, 75, 80, 90, 95, 96, 97, 98, 99, or almost 100 percent separation in just about 3, 4, 5, 6, 7, 8, 9, 10, 11, 12, 13, 14, 15, 20 or 25 minutes without damaging the carpet components. In certain embodiments, the two vectors of mechanical disruption can be performed or caused by, e.g., mixing or blender blades, heads, beaters, wisks, paddles, jets, screws, or rollers, among others. In certain specific, but not limiting examples, the blender blades can have a speed from about 1-208 rpms, 2-224 rpms, 3-244 rpms, 4-265 rpms, and 5-287 rpms, 10-300 rpms, 25-400 rpms, 50-500 rpms, 75-750 rpms, 100-1,000 rpms, 150-1,500 rpms, and 200-1850 rpms, among others. For testing and comparison purposes, the two or more mechanical vectors for disrupting the fibers can be measured at 1-208 rpms, 2-224 rpms, 3-244 rpms, 4-265 rpms, and 5-287 rpms, 10-300 rpms, using a hand blender, e.g., Rival Hand Mixer Model#

HM-743, which can provide separation of about 70, 75, 80, 90, 95, 96, 97, 98, 99, or almost 100 percent separation in just about 3, 4, 5, 6, 7, 8, 9, 10, 11, 12, 13, 14, 15 minutes. While the size of the mixing or blender blades, heads, beaters, wisks, paddles, jets, screws, or rollers for providing the mechanical separation can be varied from, about 3-4 inches, 4-6 inches, 6-12 inches, or measured in feet (1, 2, 3, 4, 5, 6, 7, 8, 9, 10 or more), the skilled artisan will be able to select the proper mechanical separation as outlined hereinabove. Briefly, the skilled artisan will generally select that size and speed that are optimal for mechanical separation that effectively separates the fibers while minimizing any damage to the fibers. As is apparent from this description, the method can be adapted for batch and/or continuous separation so long as the two vector mechanical disruption causes effective separation of the fibers while minimizing any damage to the fibers.

Following separation of the carpet components, the separated fibers can travel from the separation tank, via conveyor, into a hot air drying system, e.g., a rotating drying system that can optionally include a vacuum that helps separate lighter fibers (e.g., polypropylene fibers that are used to make the mat), from the heavier carpet fibers.

Upon exiting the dryer, fibers fall into the mouth hopper leading into a press, e.g., a roller press, or even a hydraulic roller press. By pressing the fibers, the present disclosure eliminates any adhesive that did not dissolve or separate from the mat and/or fibers during the mechanical disruption step. Crushing the adhesive has been found to be an effective way to remove any adhesive caked or still attached to the one or more polymer fibers and provides another improvement of the present disclosure. Furthermore, the press also continues the breakdown of carpet fibers by physically breaking solid bonds. Exiting press fibers can then enter a vacuum system: that can separate any remaining particles of adhesive, the polypropylene or other polymer fibers that form part of the mat, and the generally longer and heavier carpet fibers (e.g., nylon fibers). Generally, the first vacuum system will draw the lighter polypropylene backing or mat fibers from the heavier carpet fibers. The carpet fibers can then be gathered (e.g., bailed) or continue on to a 2nd vacuum system that then draws the carpet fibers into a final destination for shipping, e.g., a sealed trailer, a baler or other method of compressing the fibers without much damage.

In one specific method, the adhesive can be separated by a high temperature, boiling, or substantially boiling, water method. Carpet comes into production area in bales. Carpet is then un-baled put on conveyor, which leads to a shedder, where the carpet is cut into pieces. Carpet pieces are then sent via a conveyor to a vat, which is mixed with water. The water is brought to a temperature at or about a boiling temperature and stirred with a multi-blade blender at low revolutions per minute (RPM) for up to about 1 hour. Then the blender RPM is increased to create separation, run for about 2-5 minutes. This separates nylon, polypropylene and calcium. The remaining water is sent through a filtration system to be reused. This process may be repeated multiple times, e.g., about 1, 2, 3, 4, or more times. When the rinse is complete, the carpet fibers run threw a drying system. After drying, the fibers are sent to a hydraulic pressure roller system. This system will cause the remaining calcium and latex to break away from the nylon and polypropylene. Then the product may be sent through the first vacuum system that will separate the nylon from the calcium, latex and polypropylene. The remainder of the product will be sent through a second drying system, which separates the polypropylene from the latex and calcium. Once the process is complete, the carpet fiber (e.g., nylon), mesh backer (e.g., polypropylene), and the adhesive (e.g., latex and calcium) are all ready to be reused.

Other parameters that can be important for proper separation of the carpet components include, e.g., on-going solution measurements (e.g., to maintain the percentage of terpene solvent and/or acid balance, temperature and concentration of adhesive), tank (vat) variances, carpet type (Nylon 6, Nylon 66, PET, artificial turf, etc.), rotating hot air and measuring drying temperature, and/or the use of one or more tanks (e.g., 3 tanks, each with sufficient volume for each rinsing step). Mixing will generally be slow in the solvent solution (d-limonene or Orange oil, water, and/or acid) as the solvent is heated. Another parameter is to make sure the carpet is fully soaked in the solvent solution. Finally, before the solvent is recycled a screen can be used to separate any loose fibers of other components of the carpet before sending the solvent back to a holding tank). Another parameter that may be important for proper separation is to adjust the mixer settings to a speed that will separate carpet fibers apart from the adhesive. During any subsequent separation step, which include a second exposure to the solvent and/or rinsing steps, the mixer speed can be reduced, which allows hardened adhesive to further break down without harming the carpet fibers. Finally, hardened adhesive can also be separated from the carpet fibers and/or mesh backing materials by compressing the carpet components between two or more rollers that break the adhesive crystals or hardened adhesive into a powder, which can then be recaptured using, e.g., a vacuum system or even gravity.

Another improvement of the present disclosure is the ability to recycle the adhesive backing (commonly a combination of latex and calcium) by separating it from the water or solvent solution by skimming, filtration, screening, evaporation of the water or solvent, etc., for use as, e.g., a concrete or asphalt additive. Generally, reusing and/or regenerating the solvent is preferred. Certain mechanical and chemical features of the latex and calcium backing are favorable for use as a concrete, grout, or cement additive, with or without the inclusion of some of the polypropylene or other fibers. Thus, the present disclosure provides improvements to current processes that permit for the almost complete recycling of every portion of the carpet.

In addition to the above, some additional features can be varied in the improvements of the present disclosure, including, for newer carpet pieces (e.g., less than a year old) the solvent solution percentage may have to be increased to about 30% to 35% d-limonene or Orange oil d-limonene to water. The recycling of newer carpet can also benefit from heating to about 120° F. to 140° F., with one optimal temperature of about 130° F. For heavily used or older carpet pieces, the percentage of terpene solvent, the temperature of the water, and/or the addition of acid, can be increased to e.g., about 20% to 30% d-limonene or orange oil, which are then heated to processing temperature, which will often be at the higher end of the temperature range. While higher concentrations of the solvent solution, e.g., about 20, 30, 40, 50, 60, 75, 80, 85, and 90 or up to 100% volume-to-volume of the solution, may be used, higher concentrations might often be avoided to reduce cost. Nevertheless, in certain embodiments the present disclosure includes those higher percentages, which will reduce the processing time required and often the amount of mechanical disruption (strength and/or time). Additionally, the water and/or solvent solution can include about 10% to 20% volume to volume or a solution of acetic acid (e.g., about 5%, 10%, 15%, 20%, 25,%, or glacial acetic acid), which can be added to the terpene solvent solution (d-limonene and orange oil/d-limonene) to reduce cost and/or processing time.

FIG. 1 is a diagram that outlines one embodiment of the comprehensive carpet recycling process 10 of the present disclosure. The carpet to be recycled enters shredder 12, and the shredded carpet is then placed on conveyor 14. An optional shredded carpet holding tank 16, is shown downstream from conveyor 14 and before diverting shredded carpet into one or more conveyors 18a, 18b and 18c. The next step in the process involves placing the shredded carpet into one or more solvent or dissolution vats 20a, 20b, and/or 20c. Following the requisite amount of time in the solvent, the carpet components to be recycled can be transferred to new vats for the cleaning and/or mechanical disruption steps (not depicted), or the downstream processing steps can occur in the same vats 20a, 20b and/or 20c. In the process depicted in FIG. 1, the same vats are used for dissolving the adhesive, and the subsequent washing steps by connecting the vats 20a, 20b and/or 20c to, e.g., a solvent tank 22, a first rinse tank 24 and a second rinse tank 26, which are shown connected to a pump 28. In the illustrated embodiment, the system 10 further includes a tank 21 configured to help solids from the process to be separated from the solvent that may be reused. The system 10 may further include a tank 23 configured to help solids from the process to be separated from the rinse water that may be reused.

After processing, the separated fibers are taken via one or more conveyors 30 to a dryer 32, which can be a hot and/or rotating dryer with or without a vacuum. Following the dryer 32, a conveyor 34 takes the dried carpet components to a roller 36, which is depicted connected to a first vacuum 38, which is alternatively (as shown) connected to a second vacuum 40. The second vacuum 40, in this configuration, captures the longer and/or heavier carpet fibers, which are then transferred via conveyor 42 to a system that compresses the fibers without causing extensive damage, e.g., bailing station 44.

Figure 2:
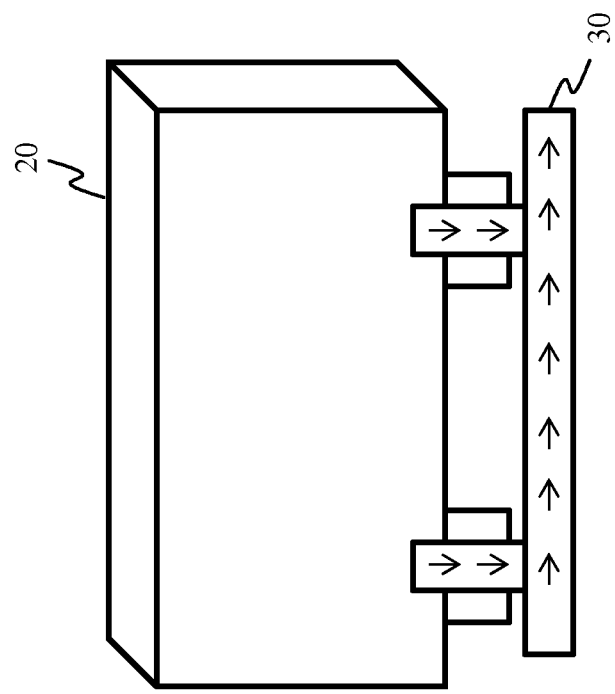
FIG. 2 shows a detailed view of one embodiment of a processing step of the present disclosure.

FIG. 2 shows a detailed view of a processing step of the present disclosure in vat 20, with additional detail, in which conveyors 30 are depicted at or below the bottom of the vat 20.

Figure 3:
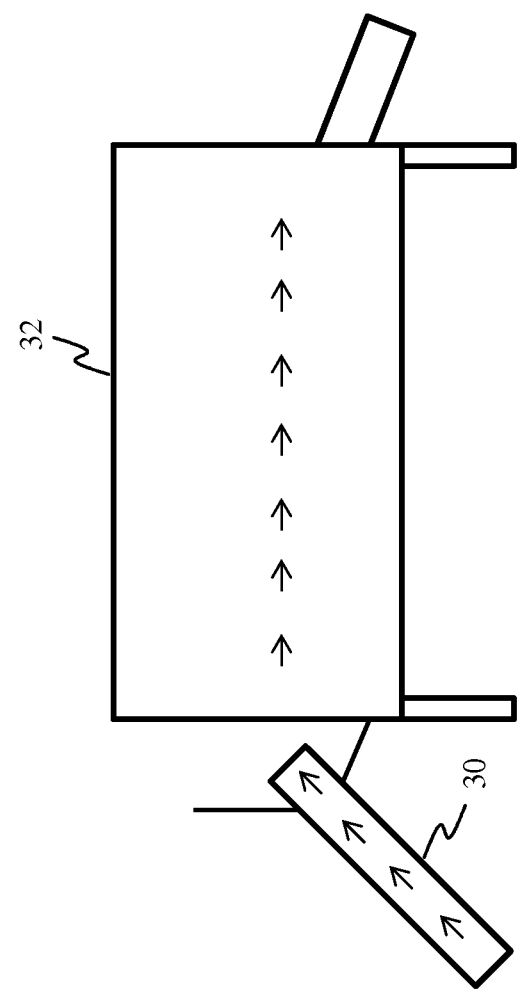
FIG. 3 shows a detailed view of one embodiment of another processing step of the present disclosure.

FIG. 3 shows a detailed view of another processing step of the present disclosure that involves the dryer 32, which is connected to the conveyor 30, in this case depicted as a rotating, heated drum.

Figure 4:
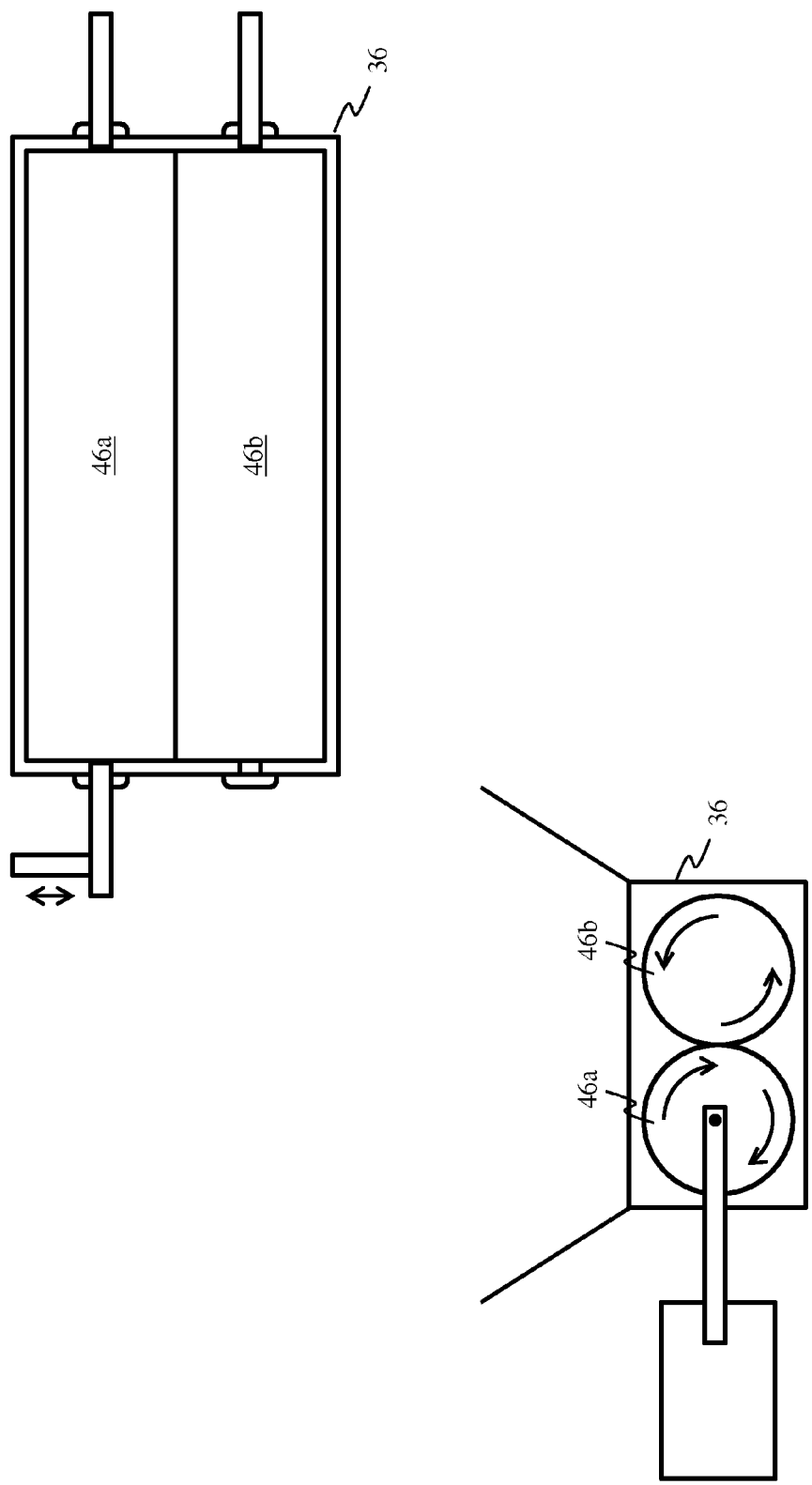
FIG. 4 shows a detailed view of one embodiment of another processing step of the present disclosure.

FIG. 4 shows a detailed view of another processing step of the present disclosure, in this case the roller or press 36, which is shown as a top view and as internal side view of the roller mechanisms 46a and 46b.

Figure 5:
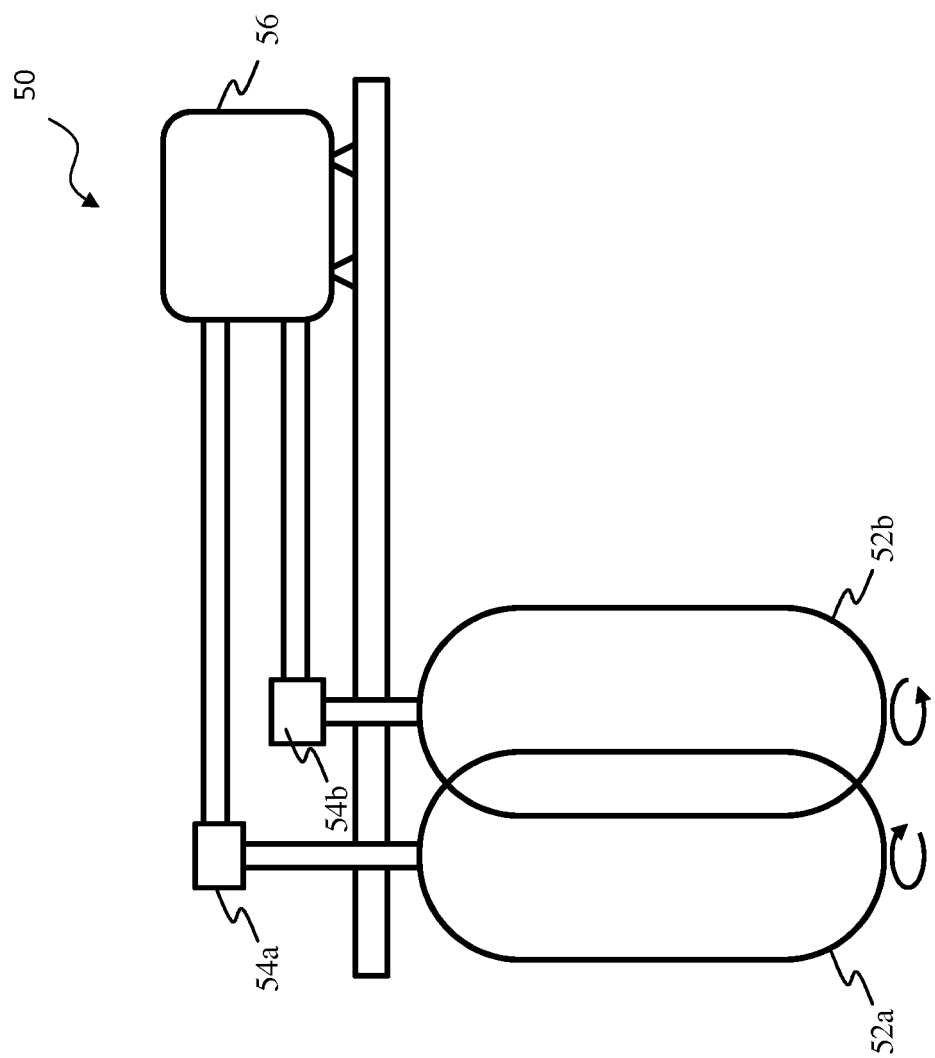
FIG. 5 shows a detailed view of another embodiment of a processing step of the present disclosure.

FIG. 5 shows a detailed view of a processing step of the present disclosure that includes the mechanical disruption system 50. The mechanical disruption system 50 is depicted having a pair of blender blades 52a, 52b, which rotate to produce the mechanical disruption in two or more vectors of the present disclosure. Often, the blades will be counter-rotating and the present disclosure can operate with about 1, 2, 3, 4, 5, 6, 7, 8, 9, 10, 15, 20, 25, 30, 35, 40, 45, 50, 60, 70, 75, 80, 90, 100, 150, 200, 250, 300, 400, 500, 600, 700, 750, 800, 900, 1,000 or more pairs of mechanical disruptors, e.g., mixing heads, blades, beaters, wisks, paddles, jets, screws, or rollers, among others. In this embodiment, the shafts of the blender blades 52a, 52b, are connected to gear boxes 54a, 54b, which is connected to a motor 56.

It is contemplated that any embodiment discussed in this specification can be implemented with respect to any method, kit, reagent, or composition of the disclosure, and vice versa. Furthermore, compositions of the disclosure can be used to achieve methods of the disclosure.

It will be understood that particular embodiments described herein are shown by way of illustration and not as limitations of the disclosure. The principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In certain embodiments, the present disclosure may also include methods and compositions in which the transition phrase "consisting essentially of" or "consisting of" may also be used, and which refer to the use of the active components or solutions of the present disclosure with no additional active agent(s).

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least plus-or-minus 1, 2, 3, 4, 5, 6, 7, 10, 12 or 15%.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

Those skilled in the art to which this application relates will appreciate that other and further additions, deletions, substitutions and modifications may be made to the described embodiments.

What is claimed is:

1. An improved method of recycling one or more polymers from a flooring material that has been contacted with a solvent to provide a reclaimed polymer composition, the improvement comprising:
   prior to the step of contacting the flooring material with the solvent, cutting the flooring material into portions that provide substantially complete contact between the flooring material and the solvent; and
   following the step of contacting the flooring material with the solvent, contacting the portions of flooring material with a mechanical disruptor that both pulls and separates the one or polymers concurrently in at least two different vectors for a time sufficient to separate the one or more polymers, wherein the flooring material includes the one or more polymers and an adhesive backing, and further wherein the mechanical disruptor both pulls and separates the one or more polymers from the adhesive backing concurrently in at least two different vectors for a time sufficient to separate the one or more polymers from the adhesive backing.

2. The method of claim 1, wherein greater than about 70% of components of the flooring material may be recycled.

3. The method of claim 1, wherein the solvent is selected from at least one of a terpene solvent, a D-limonene, a pinene, an α-pinene or water.

4. The method of claim 1, wherein the wherein the solvent is a soy based solvent.

5. The method of claim 1, wherein the mechanical disruptor is contacted with the portions of the flooring material for a time sufficient to separate the one or more polymers without substantially shearing the one or more polymers.

6. The method of claim 1, wherein the mechanical disruptor is contacted with the portions of the flooring material for about 1 to 30 minutes to separate the one or more polymers without substantially shearing the one or more polymers.

7. The method of claim 1, wherein the one or more polymers are selected from at least one of a HDPE, LDPE, LLDPE, ULDPE, VLDPE, VLLDPE, copolymers of ethylene and α-olefins, polypropylene, copolymers of propylene and α-olefins, copolymers of propylene and ethylene, EVA, and EMA.

8. The method of claim 1, wherein following the separation of the one or more polymers, the one or more polymers are at least about 70% ash-free.

9. The method of claim 1, wherein following the separation of the one or more polymers, the one or more polymers are substantially ash-free.

10. A method of recycling one or more polymers from a flooring material comprising:
    cutting flooring material into portions that provide substantially complete contact between the flooring material and a solvent;
    subjecting the flooring material portions to a solvent to dissolve an adhesive backing thereof;
    contacting the flooring material portions with a mechanical disruptor that both pulls and separates one or more polymers of the flooring material from the adhesive backing concurrently in at least two different vectors for a time sufficient to separate the one or more polymers from the adhesive backing; and
    separating remaining adhesive away from the one or more polymers by at least one of crushing or squeezing, wherein greater than about 70% of components of the flooring material may be recycled.

11. The method of claim 10, wherein greater than about 90% of components of the flooring material may be recycled.

12. The method of claim 10, wherein substantially all components of the flooring material may be recycled.

13. The method of claim 10, wherein the solvent is selected from at least one of a terpene solvent, a D-limonene, a pinene, an α-pinene or water.

14. The method of claim 10, wherein the mechanical disruptor comprises two or more mixing heads, blades, beaters, wisks, paddles, jets, screws, or rollers that provide the mechanical disruption in the at least two different vectors.

15. The method of claim 10, wherein the flooring material portions are contacted with the mechanical disruptor after subjecting the flooring material portions to the solvent.

16. The method of claim 10, wherein the flooring material portions are contacted with the mechanical disruptor for about 1 to 30 minutes to separate the one or more polymers without substantially sheering the one or more polymers.

17. The method of claim 10, wherein the one or more polymers are selected from at least one of a HDPE, LDPE, LLDPE, ULDPE, VLDPE, VLLDPE, copolymers of ethylene and α-olefins, polypropylene, copolymers of propylene and α-olefins, copolymers of propylene and ethylene, EVA, and EMA.

18. The method of claim 10, wherein following the separation of the one or more polymers, the one or more polymers are at least about 70% ash-free.

19. A system for recycling one or more polymers from a flooring material comprising:
    one or more shredders capable of cutting flooring material into portions of a size that provides complete contact between the flooring material and a solvent capable of dissolving an adhesive backing of the flooring material away from one or more flooring material polymers;
    a vat or container in communication with the one or more shredders, the vat or container configured to accept the cut flooring material portions and subject the cut flooring material portions to the solvent;
    a mechanical disruptor that both pulls and separates the one or more polymers from the adhesive backing concurrently in at least two different vectors for a time sufficient to separate the one or more polymers from the adhesive backing following subjecting the cut flooring material portions to the solvent; and
    one or more rollers configured to crush adhesive particles remaining on the one or more polymers, wherein the system achieves complete separation of the one or more polymer components and the adhesive backing without substantially shearing the one or more polymers.

* * * * *